US007860107B2

(12) United States Patent
Legg

(10) Patent No.: US 7,860,107 B2
(45) Date of Patent: Dec. 28, 2010

(54) APPARATUS AND METHOD FOR DETERMINING TIMING FOR TRANSMISSIONS

(75) Inventor: Peter J. Legg, Swindon (GB)

(73) Assignee: IPWireless, Inc., San Francisco, CA (US)

( * ) Notice: Subject to any disclaimer, the term of this patent is extended or adjusted under 35 U.S.C. 154(b) by 115 days.

(21) Appl. No.: 11/948,647

(22) Filed: Nov. 30, 2007

(65) Prior Publication Data
US 2009/0141646 A1   Jun. 4, 2009

(51) Int. Cl.
H04L 12/28 (2006.01)
(52) U.S. Cl. ............... 370/395.4; 370/312; 370/315; 455/39; 455/73
(58) Field of Classification Search ............ None
See application file for complete search history.

(56) References Cited

U.S. PATENT DOCUMENTS

2004/0072567 A1*  4/2004  Cao et al. ............ 455/442
2005/0147040 A1*  7/2005  Vayanos et al. ........ 370/235

FOREIGN PATENT DOCUMENTS

EP       1 643 784 A1    4/2006

OTHER PUBLICATIONS

3rd Generation Partnership Project. (May 2007). "Proposal in Iub Efficiency for MBMS in IP RAN," 3GPP TSG RAN WG3 Meeting #56, Kobe, JP, May 7-11, 2007, Agenda Item 13.10.2, 4 pages.

3rd Generation Partnership Project. (Dec. 2007). "Introduction of the Multimedia Broadcast Multicast Service (MBMS) in the Radio Access Network (RAN)," 3GPP Technical Specification 25.346, Release 7, 64 pages.
3rd Generation Partnership Project. (Dec. 2007). "Synchronisation in UTRAN Stage 2," 3GPP Technical Specification 25.402, Release 7, 51 pages.
3rd Generation Partnership Project. (Dec. 2007). "UTRAN Iub Interface User Plane Protocols for Common Transport Channel Data Streams," 3GPP Technical Specification 25.435, Release 7, 52 pages.

(Continued)

*Primary Examiner*—Ayaz R Sheikh
*Assistant Examiner*—Nicholas Sloms
(74) *Attorney, Agent, or Firm*—Fitch, Even, Tabin & Flannery

(57) ABSTRACT

A communication network element (536) comprises a transmitter (535) for transmitting at least one timing data packet to at least one further network element (524) over both a first communication link and a second communication link and a receiver (537) for receiving two timing data packets from the at least one further network element (524) over the second communication link. The communication network element (536) further comprises signal processing logic (538) operably coupled to the transmitter and receiver and arranged to calculate a transit delay of the at least one timing data packet over the first communication link based on the received two timing data packets from the at least one further network element (524) over the second communication link, wherein the signal processing logic (538) is capable of scheduling at least one transmission across the first communication link to the at least one further network element (524) in response thereto.

19 Claims, 7 Drawing Sheets

OTHER PUBLICATIONS

Holma, H. et al. eds. (2001) *WCDMA for UMTS: Radio Access for Third Generation Mobile Communications*, Wiley & Sons Publishing: Chichester, UK, pp. v-xii, (Table of Contents Only.).
International Search Report and Written Opinion of the International Searching Authority Dated Apr. 28, 2009 from PCT/EP2008/066140.

"Universal Mobile Telecommunications System (UMTS); Synchronization in UTRAN Stage 2 (3GPP TS 25.402 version 7.4.0 Release 7); ETSI TS 125 402" ETSI Standards, LIS, Sophia Antipolis Cedex, France, vol. 3-R3, No. V7.4.0, Oct. 1, 2007, XP014040032 ISSN: 0000-0001 Chapters 5-7, 11.

* cited by examiner

APPARATUS AND METHOD FOR DETERMINING TIMING FOR TRANSMISSIONS

FIELD OF THE INVENTION

The field of the invention relates to multicast transmissions in communication systems and in particular, but not exclusively, to timing of multicast transmissions for Multimedia Broadcast Multicast Service (MBMS) in a 3rd Generation Partnership Project (3GPP) communication system.

BACKGROUND OF THE INVENTION

Currently, 3rd generation cellular communication systems are being rolled out to further enhance the communication services provided to mobile phone users. The most widely adopted 3rd generation communication systems are based on Code Division Multiple Access (CDMA) and Frequency Division Duplex (FDD) or Time Division Duplex (TDD) technology. Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

One enhanced feature being developed in the 3rd generation partnership project (3GPP) standard is the provision of multimedia services to mobile phone users, utilising Multimedia Broadcast Multicast Service (MBMS).

In MBMS, point-to-multipoint delivery can be made where a wireless communication unit (termed user equipment (UE) in 3GPP parlance) is able to perform soft combining of received transmissions from multiple base stations. In release-6 of 3GPP, this form of combining is referred to as Layer-1 Combining or Transport Channel Combining (in TDCDMA). Furthermore, MBMS over a Single Frequency Network (MBSFN) has been introduced in release-7 of the specifications, for TDCDMA and WCDMA. In MBSFN, identical waveforms are transmitted simultaneously from multiple base stations and soft combined by the UE.

FIG. 1 illustrates an outline of a known MBMS point-to-multipoint system where delivery of data content is performed using a Forward Access Channel (FACH) frame protocol 115 to enable soft combining at the wireless communication unit (UE) 130. A requirement for soft combining to work is that the radio transmissions from the different base stations, referred to as Node Bs 120 in 3GPP parlance, within a combining cluster of cells, take place simultaneously. The scheduling of radio transmissions is performed by a radio network controller (RNC) 110, which identifies the bits (termed transport blocks) contained in the broadcast/multicast content 105 that should be sent in each 10 msec. radio frame. The transport blocks are then transmitted to each Node B 120 using a framing protocol: the Forward Access Channel (FACH) Frame Protocol 115, as defined in 3GPP TS25.435 'UTRAN $I_{ub}$ Interface User Plane Protocols for Common Transport Channel Data Streams'. The FACH is the name of the transport channel that is used to convey the bits to the user.

Every FACH Frame Protocol message 115 carries a frame number stamp, the CFN, which informs the Node B 120 of the particular frame in which the transmission should take place. The interface between the RNC 110 and the Node B 120 is called the $I_{ub}$. According to the topology of the $I_{ub}$ the transfer delay of the FACH frame protocol from the RNC 110 will vary amongst the set of Node Bs 120. For example, with a star topology, with a small number of Node Bs 120 to be addressed and a relatively low number of intermediate nodes, the delay variation across the set of Node Bs 120 is expected to be small.

However, if the Node Bs 120 are configured in a chain topology, the delay to the Node B(s) 120 at the end of the chain is greater than those at the head of the chain. It is noteworthy that, when the Node B 120 supports multiple cells (sectors), individual frame protocols shall be sent for each cell. MBMS combining is restricted to data sourced from a single RNC 110.

In the TDCDMA mode of MBMS, it is relatively straightforward to align the framing of all of the Node Bs 120 by using an external synchronisation signal, such as may be derived from a geo-stationary position system (GPS), for example as defined in 3GPP TS25.402 'Synchronisation in UTRAN Stage 2'. Furthermore, not only can the frame boundaries be synchronised between Node Bs 120, but the System Frame Numbers (SFN) can also be made equal. When a Node B 120 receives a FACH Frame Protocol message 115 it determines the earliest SFN value that satisfies the criteria:

SFN mod 256=CFN mod 256 where: 'mod' means take the modulus.

Since all Node Bs 120 agree on the SFN, the CFN stamp should be the same to each Node B 120 to support the simultaneous transmission of the transport blocks carried within the FACH Frame Protocol 115.

For WCDMA the framing and the frame numbers of the individual Node Bs 120 are not aligned. This complicates the behaviour of the RNC 110, as the RNC 110 needs to track the relative timing of each Node B 120 individually. Furthermore, the RNC 110 needs to stipulate offsets with respect to frame boundaries that should be employed (e.g. a different offset in each Node B 120). However, in other respects the behaviour is the same as for TDCDMA. The remaining of the background discussion will be focused on TDCDMA.

Each Node B 120 is able to buffer the frame protocol messages 115 for a number of frames waiting for the correct SFN to come round. The maximum configurable buffer size is '128' frames, since it is ambiguous whether a frame has arrived early or late when the buffer is any larger (the range of CFN values being '0' to '255'). If the data arrives too late at the Node B 120, the data falls outside the buffer and the data is discarded. Furthermore, the ability of the Node B 120 to contribute to the soft combining for the received data at the UE is also lost. Therefore, a key task of the RNC 110 is to ensure that the data in the FACH Frame Protocol message 115 arrives at each Node B 120 within the respective Node B 120's receive buffer. To facilitate this task, the RNC 110 needs to know the transit delay from the RNC 110 to each Node B 120 for the FACH Frame Protocol 115, as well as the framing of each Node B 120 relative to its own framing, so that the CFN can be set correctly.

In 3GPP the RNC 110 determines a relative framing between itself and a Node B 120, using the RNC-Node B Node Synchronisation procedure 200, as illustrated in FIG. 2. In FIG. 2, the RNC 110 employs the RNC to Node B synchronisation procedure 200, in order to determine a relative phase of its own timing (RFN) and that of the Node Bs (BFN). RFN is the RNC Frame Number counter, with a range of '0' to '4095' frames. BFN is the Node B Frame Number counter, with a range of '0' to '4095' frames. The RNC 110 sends a downlink (DL) 'DL NODE SYNCHRONISATION' frame 210 to the Node B 120, and the Node B 120 returns an uplink (UL) 'UL NODE SYNCHRONISATION' frame 220. When the RNC 110 has measured a round-trip delay (RNC 110 to Node B 120 and back to the RNC 110) using the procedure of FIG. 2, the RNC 110 is able to calculate the single trip delay (230, 240) by dividing this by two—assuming a symmetrical DL/UL $I_{ub}$.

This procedure is repeated for each Node B 120. After following the known procedure in FIG. 2, the RNC 110 now knows the relative framing of itself to each Node B 120, as well as the round-trip time to each Node B 120. However, the RNC 110 does not know the SFN in each Node B 120, but this is not needed since the SFN is locked to the known BFN.

There are now two options open to the RNC 110:
(i) Send individual frame protocol messages to each Node B 120, thereby ensuring that each message arrives with just enough time for the Node B 120 to process the received frame and transmit the processed frame in the correct frame, or
(ii) Send all the frame protocol messages 115, with the same CFN stamp, at the same time. The timing of the transmission is governed by the Node B 120 that has the greatest transfer time from the RNC 110 to itself.

When option (ii) is followed, the Node B 120 that has the shortest transit time needs to buffer the incoming frames for the longest time. The advantage of option (ii) is that the RNC 110 only needs to track the greatest transit time amongst a set of Node Bs 120. As long as the frame protocol message 115 having the greatest transit time arrives in sufficient time at the Node B 120, then the frame protocol message 115 having the greatest transit time will also arrive in sufficient time at all the other Node Bs 120. A minor disadvantage of option (ii), when compared to option (i), is the requirement to include memory at the Node B 120 to buffer frames. The memory, as stated earlier, is upper-bounded by '128' frames worth of data (which for a 500 kb/sec. service equates to about 80 kB, so that the memory demands are unlikely to be onerous in typical implementations).

In a real system, it is expected that the transit time to each Node B 120 may vary with time, due to jitter on the backhaul ($I_{UB}$) link. Furthermore, the relative framing of the RNC 110 to the Node B 120 needs to be continuously reassessed, due to the relative drift in their respective clocks. Therefore, it is useful to periodically repeat the Node synchronisation procedure of FIG. 2. By tracking the transit delays to each Node B 120, or in particular the Node Bs 120 which are known to have the greatest delay, the RNC 110 is able to schedule the time of transmission of the frame protocol messages so that the latency can be minimised. In principle, the RNC 110 could assume a very large worst-case transit time to the set of Node Bs 120 and employ this all the time. However, the disadvantage of this approach is the additional latency incurred.

In the aforementioned known architecture of FIG. 1, there is a bidirectional link between the RNC 110 and every Node B 120. This bidirectional link is used to configure the Node B using the Node B application protocol (NBAP). The bidirectional link is used by the user plane protocol to send the FACH Frame Protocol and the control frame protocols, such as those used by the node synchronisation procedure of FIG. 2.

However, the architecture does not scale well to large numbers of Node Bs 120, which may be required for the broadcasting of mobile television. One problem is that the RNC 110 needs to operate a FACH Frame Protocol user plane to each Node B 120 individually. Furthermore, if a backhaul link is shared by two or more Node Bs 120, then the capacity of the shared link must accommodate the multiple copies of the same frame protocol. Note that whilst the frame protocol may be the same, the transport layer on which each frame is carried is different—there is a unique transport layer address for each Node B 120. If IP (Internet Protocol) transport is employed, unique unicast IP addresses/UDP port numbers are used. These drawbacks may be addressed by using IP multicast for the transmission of the FACH Frame Protocol.

Referring now to FIG. 3, a simplified Internet Protocol (IP) network 300 is illustrated, where IP multicast on the $I_{ub}$ is employed, the RNC 110 generates a single FACH Frame Protocol (FP) message 115 and this is mapped onto the Internet Protocol (IP) transport layer using an IP multicast address. All the Node Bs 120 that are required to transmit the content of the frame to a UE 130 are informed of this address and they join the multicast group for this address (using the IGMP protocol). The frame is sent from the RNC 110 to a first router 310, which then duplicates the IP data packet and transmits 315 the duplicated IP data packet to other routers 320 that have been identified as lying on the path to a Node B 120 that has joined the multicast group. Complex routing algorithms are therefore employed to determine the optimum routing path for the multicast FP frames. Hence, a tree hierarchy is established by IGMP linking the RNC 110 to the Node Bs 120 using a mesh of intermediate routers 320.

The IP network may also be conveniently realised using a satellite distribution network 400, as illustrated in FIG. 4. IP multicast distribution over the $I_{ub}$ has been proposed for 3GPP by Huawei in R3-071035, RAN3 Meeting 56, Kobe, 7 May 2004, in a document titled 'Proposal on $I_{ub}$ efficiency for MBMS in IP RAN'. In FIG. 4, an IP multicast transmission 105 is sent to the RNC 110 and translated to a FACH FP message 115 to be forwarded to a satellite head end 405. The satellite earth station 410 then transmits the FACH FP message on a satellite uplink channel 415 to a satellite 420, which relays the FACH FP message on a number of downlink channels 425 to a number of Node Bs 120. With this proposed approach, the previously indicated option (ii) of sending packets to all Node Bs starting from the same point in time is effectively followed.

When FACH frames are delivered over the multicast network, a bidirectional unicast link from the RNC 110 to each Node B 120 is also required. Therefore, two $I_{ub}$ connections per Node B 120 are required, a first multicast $I_{ub}$, carrying FACH frames on a unidirectional link, and a second unicast $I_{ub}$, providing a bidirectional link and used to manage the Node B (NBAP). This second unicast $I_{ub}$ is used for user plane control Frame Protocols (e.g. DL & UL Node Synchronisation messages).

The inventor has recognised that, in the architecture of FIG. 4, the RNC 110 is unable to determine the transit time for each Node B 120 for the multicast FACH traffic. In principle a DL Node Synchronisation message may be sent over the multicast downlink and a response can be returned using the UL Node Synchronisation message. However, the round trip delay (RTD) is no longer balanced equally between downlink and uplink and the required metric cannot simply be obtained by halving the RTD.

Thus, a need exists for providing a mechanism to determine timing for MBMS point-to-multipoint distribution using IP multicast on an $I_{ub}$ link.

SUMMARY OF THE INVENTION

Accordingly, the invention seeks to mitigate, alleviate or eliminate one or more of the abovementioned disadvantages singly or in any combination.

According to a first aspect of the invention, there is provided a communication network element comprising a transmitter for transmitting at least one timing data packet to at least one further network element over both a first communication link and a second communication link; and a receiver for receiving two timing data packets from the at least one further network element over the second communication link. The communication network element further comprises signal processing logic operably coupled to the transmitter and receiver and capable of calculating a transit delay of the at least one timing data packet over the first communication link based on the received two timing data packets from the at least one further network element over the second communication link. The signal processing logic is further capable of scheduling at least one transmission across the first communication link to the at least one further network element in response thereto.

In one embodiment of the invention, employing the inventive concept provides an assessment of a transfer delay of data packets over a communication path having a number of alternative routes or an asymmetrical link, rather than an assessment of whether different transport channels are arriving on time. In one embodiment of the invention, employing the inventive concept is of benefit because it is possible to accurately set a frame advance, thereby minimising latency in the communication system and minimising the Node B buffer capacity.

In one embodiment of the invention, employing the inventive concept utilises the existing Node Synchronisation procedure employed over the bidirectional link, which is needed to maintain knowledge of clock/frame alignment between the RNC and Node B.

According to an optional feature of the invention, the signal processing logic is capable of calculating a worst case transmit delay for transmissions to a plurality of further network elements. One advantage of this feature may be that, given the worst-case transmit delay, the frame advance may be determined such that the data packets arrive just-in-time at the Node B with the worst-case transmit delay, and thus before they are required at the other Node Bs.

According to an optional feature of the invention, the signal processing logic is capable of scheduling a transmission to a number of further network elements in response to a comparison between the calculated transmit delay over the first communication link and the calculated worst case transmit delay.

According to an optional feature of the invention, the signal processing logic adds a first transmit timestamp (T1) to the at least one timing data packet over at least one of the first communication link and the second communication link. The at least one further network element may add a receive timestamp (T2) indicating a time that the timing signal is received and may add a second transmit timestamp (T3) when transmitting the timing data packet to the communication network element According to an optional feature of the invention, the signal processing logic receives the two timing signals from the at least one further network element over the second communication link in response to the respective transmissions over the first and second communication links.

According to an optional feature of the invention, the first communication link is a unidirectional multicast link. This is a distinct advantage for satellite delivery, since bidirectional satellite systems are more complex and expensive to deploy.

According to an optional feature of the invention, the communication network element supports communication of a FACH Frame Protocol using IP multicast delivery. This delivery mode may provide the advantage that the bandwidth required on the downstream backhaul is minimised, since between any two nodes there is only the requirement for one packet per multicast stream rather than one packet per stream per end recipient (Node B).

According to an optional feature of the invention, the communication network element may support communication in a $3^{rd}$ Generation Partnership Project (3GPP) cellular communication network over at least one of: Multimedia Broadcast Multicast Service (MBMS) with soft combining; MBMS over a Single Frequency Network (MBSFN); Iub communication over a satellite or a terrestrial communication link.

According to an optional feature of the invention, a downlink Node Synchronisation message may be transmitted over at least one of the first and second communication links, and in response thereto an UL Node Synchronisation message may be transmitted over the second communication link.

According to an optional feature of the invention, the communication network element is one of: a radio network controller, a base station controller.

According to a second aspect of the invention, there is provided a communication system comprising a communication network element. The communication network element comprises a transmitter for transmitting at least one timing data packet to at least one further network element over both a first communication link and a second communication link; and a receiver for receiving two timing data packets from the at least one further network element over the second communication link. The communication network element further comprises signal processing logic operably coupled to the transmitter and receiver and capable of calculating a transit delay of the at least one timing data packet over the first communication link based on receiving two timing data packets from the at least one further network element over the second communication link, and capable of scheduling at least one transmission across the first communication link to the at least one further network element in response thereto.

According to a third aspect of the invention, there is provided a method for determining a timing of multicast transmissions from a network element. The method comprises transmitting at least one timing data packet to at least one further network element over both a first communication link and a second communication link; and receiving two timing data packets from the at least one further network element over the second communication link. The method further comprises calculating a transit delay of the at least one timing data packet over the first communication link based on receiving two timing data packets from the at least one further network element over the second communication link; and scheduling at least one transmission across the first communication link to the at least one further network element in response thereto.

According to a fourth aspect of the invention, there is provided logic for determining a timing of multicast transmissions from a network element. The logic comprises logic for transmitting at least one timing data packet to at least one further network element over both a first communication link and a second communication link; and logic for receiving two timing data packets from the at least one further network element over the second communication link. The logic further comprises logic for calculating a transit delay of the at least one timing data packet over the first communication link based on receiving two timing data packets from the at least one further network element over the second communication link; and logic for scheduling at least one transmission across the first communication link to the at least one further network element in response thereto.

According to a fifth aspect of the invention, there is provided a communication network element comprising a receiver for receiving at least one timing data packet from a network controller element over both a first communication link and a second communication link; and a transmitter for transmitting two timing data packets from the communication network element over the second communication link; such that the network controller element is capable of calculating a transit delay of the at least one timing data packet over the first communication link based on the transmitted two timing data packets over the second communication link, and wherein the communication network element is capable of receiving at least one scheduled transmission across the first communication link from the network controller element based thereon.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

The following description focuses on embodiments of the invention applicable to a UMTS (Universal Mobile Telecommunication System) cellular communication system, and in particular to a UMTS Terrestrial Radio Access Network (UT-RAN) operating within a $3^{rd}$ generation partnership project (3GPP) system. The inventive concept is concerned with the delivery of user plane content from the RNC to the Node B in a $3^{rd}$ Generation Partnership Project (3GPP) Multimedia Broadcast Multicast Service (MBMS) system, as defined by 3GPP in "TS25.346—Introduction of the MBMS in the Radio Access Network". This document provides a mechanism to deliver broadcast or multicast content to a number of subscriber devices over the 3GPP air-interfaces, time division CDMA (TDCDMA) and wideband CDMA (WCDMA).

However, it will be appreciated that the invention is not limited to the described communication system, but may be applied to other communication systems, for example to MBSFN (MBMS over a Single Frequency Network), which has been introduced in release seven of the specifications, for TDCDMA and WCDMA. In MBSFN identical waveforms are transmitted simultaneously from multiple base stations. Additionally, the apparatus and method to determine the transit time over the multicast communication link may also be applicable to 3GPP long term evolution (LTE) MBMS, although in this case a skilled person would appreciate that the means to deliver the data packets is slightly different. A skilled artisan will appreciate that the apparatus and method may find application in other broadcasting systems that rely upon synchronous transmission from a number of base stations.

Figure 1:
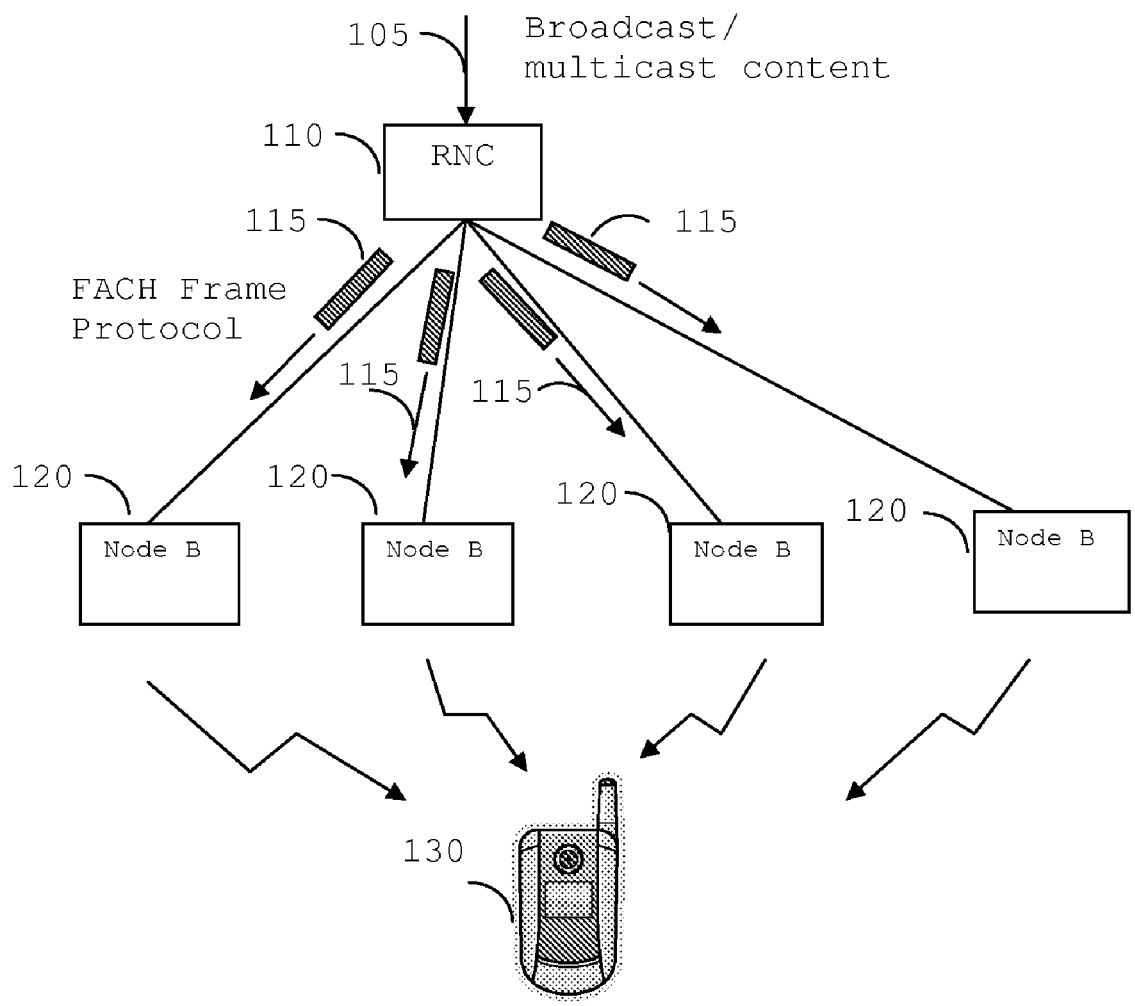
FIG. 1 illustrates a MBMS point to multipoint delivery using FACH Frame Protocol to enable soft combining at the handset in a known system.
Figure 2:
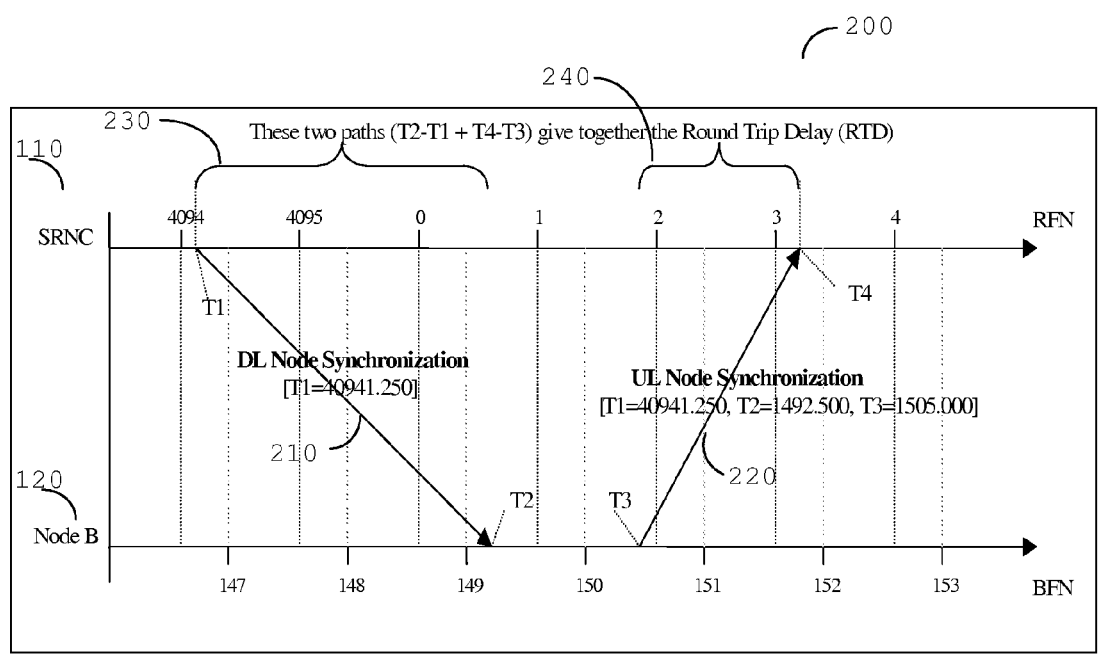
FIG. 2 illustrates a timing diagram of a known RNC to Node B node synchronisation mechanism.
Figure 3:
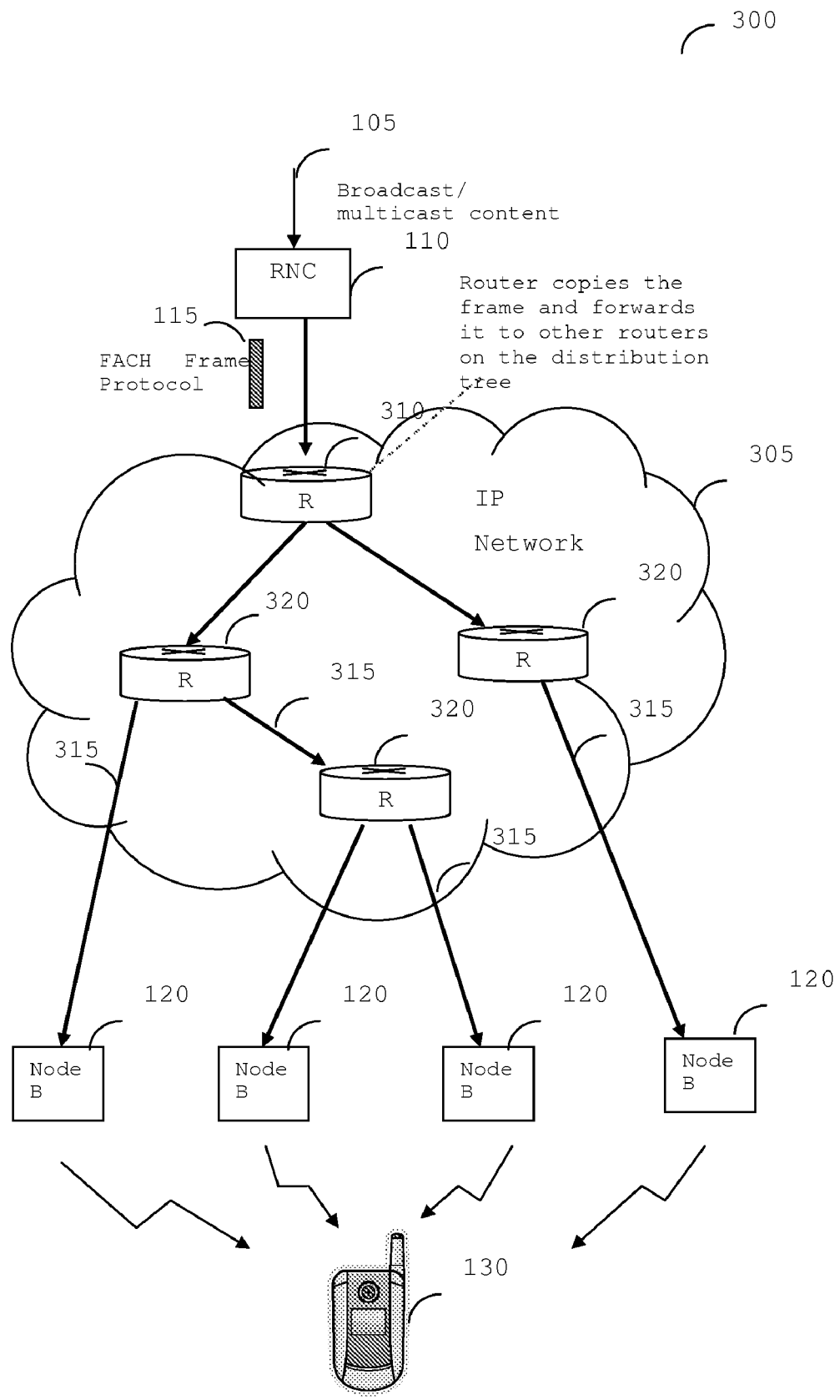
FIG. 3 illustrates a known distribution of FACH Frame Protocol using multicast delivery over the $I_{ub}$.
Figure 4:
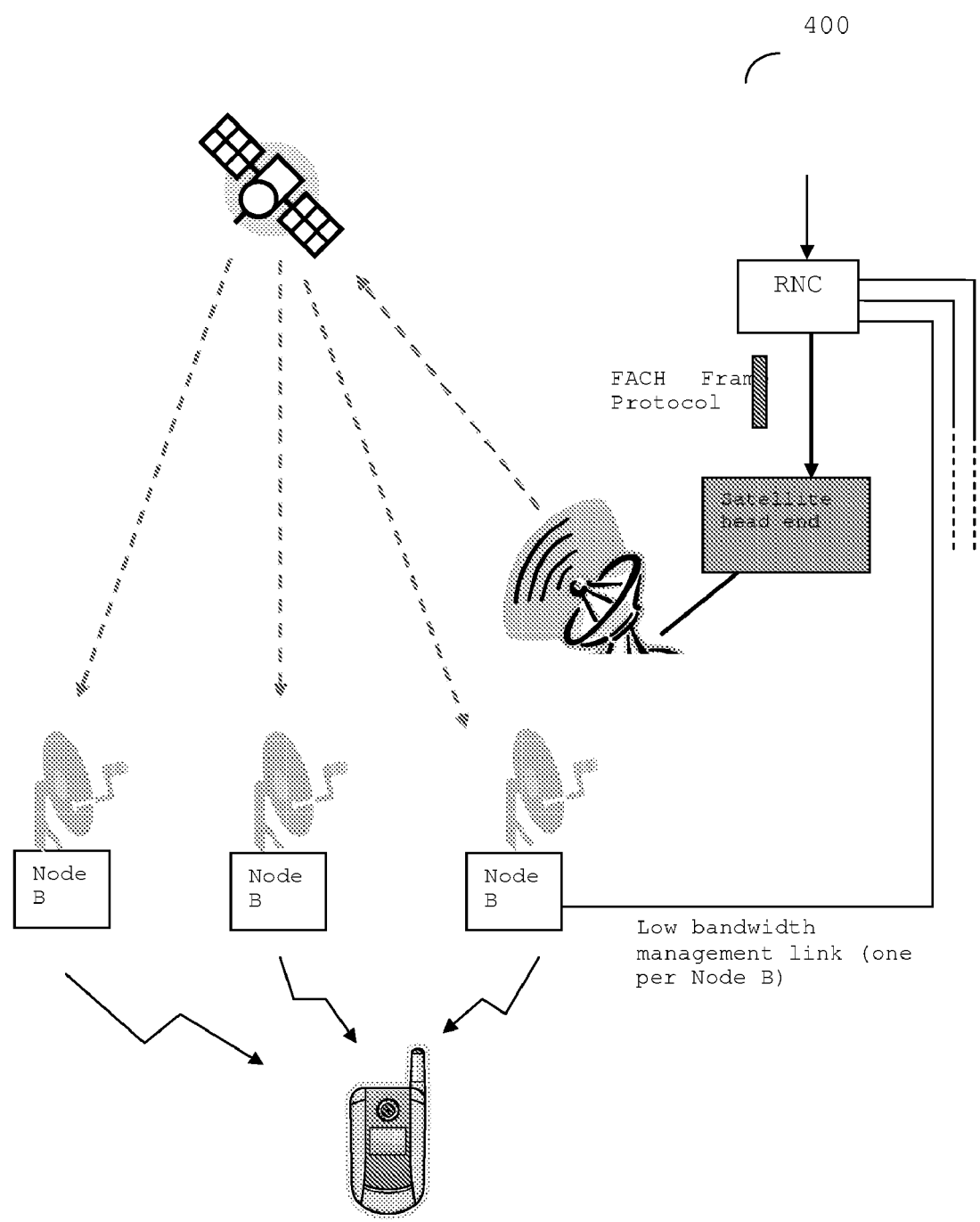
FIG. 4 illustrates a known distribution of FACH Frame Protocol using multicast delivery over a satellite network.
Figure 5:
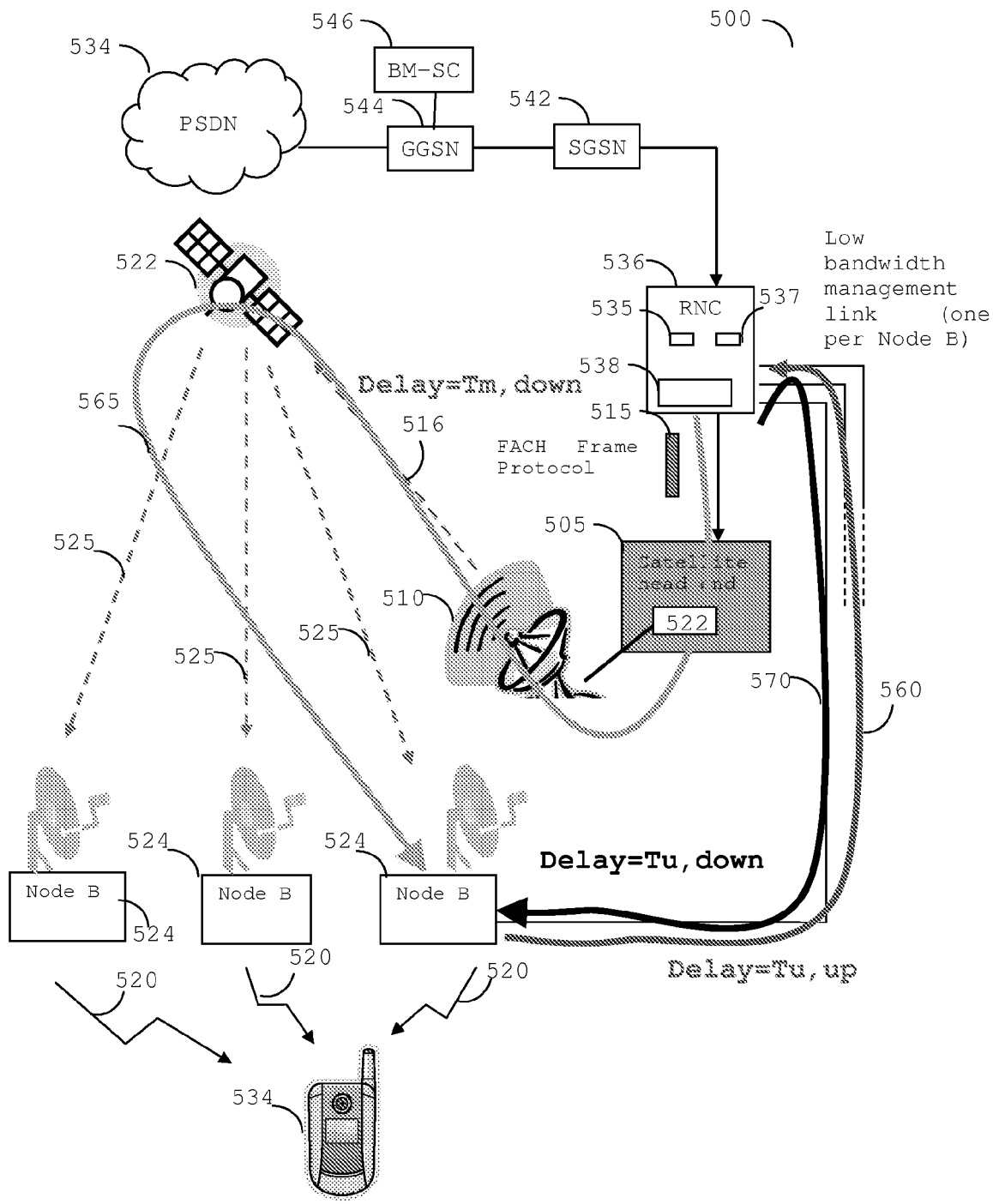
FIG. 5 illustrates a communication system in accordance with embodiments of the invention.

Referring now to FIG. 5, a cellular/satellite-based communication system 500 is shown in outline, in accordance with embodiments of the invention. Wireless subscriber communication units (or user equipment (UE) in UMTS nomenclature), such as UE 534, communicate over radio links 520, often referred to as air-interfaces, with a plurality of base transceiver stations, referred to under UMTS terminology as Node Bs, such as Node B 524. The communication system 500 may comprise many other UEs and Node Bs, which for clarity purposes are not shown.

The wireless communication system 500, sometimes referred to as a Network Operator's Network Domain, is connected to an external network 534, for example the Internet or a streaming content provider, for example, a broadcast Multicast Service Centre (BM-SC) 546. The Network Operator's Network Domain includes:

(i) A core network, namely at least one Gateway General Packet Radio System (GPRS) Support Node (GGSN) 544 and at least one Serving GPRS Support Nodes (SGSN) 542; and (ii) An access network, namely UMTS Radio network controller (RNC) 536, often referred to as a Base Station Controller, and a plurality of UMTS Node Bs 524.

The GGSN 544 or SGSN 542 is responsible for UMTS interfacing with a Public network, for example a Public Switched Data Network (PSDN) (such as the Internet) 534 or a Public Switched Telephone Network (PSTN). The GGSN 544 is additionally responsible for interfacing to the BM-SC 546. The SGSN 542 performs a routing and tunnelling function for traffic, whilst a GGSN 544 links to external packet networks.

The Node Bs 524 are connected to external networks, through controller stations, such as Radio Network Controller (RNC) 536, and mobile switching centres (MSCs), such as SGSN 542. A cellular communication system will typically have a large number of such infrastructure elements where, for clarity purposes, only a limited number are shown in FIG. 5.

In accordance with embodiments of the invention, each Node B 524 comprises one or more transceiver units and communicates with the RNC 536 over a bi-directional low bandwidth unicast backhaul link 560, 570 via an $I_{ub}$ interface, as defined in the UMTS specification, and over a uni-directional multicast link, for example over a satellite network as shown. For clarity, backhauling is concerned with transporting traffic between distributed sites (typically access points) and more centralised points within a network. Examples of backhaul links include, by way of example only, connecting Node Bs to their corresponding RNCs.

In accordance with one embodiment of the invention, the satellite network comprises an unidirectional multicast link comprising a satellite head end 505 operably coupled to an RNC 536 and arranged to receive a FACH FP data packet encapsulated within an IP multicast packet therefrom. The satellite head end, in a simplified description, modulates the incoming packets onto the satellite uplink carrier and is operably coupled to a satellite Earth station antenna 510, arranged to transmit 565 the FACH FP data packet over a satellite communication link and comprising satellite transceiver 522. The satellite communication link comprises an uplink communication channel 516 between the satellite Earth station 510 and the satellite transceiver 522, and a plurality of downlink communication channels 525 between the satellite transceiver 522 and a respective plurality of wireless serving communication units (e.g. Node Bs 524).

In accordance with one embodiment of the invention, the RNC 536 comprises signal processing logic 538 adapted to calculate transit delays to respective Node Bs 524, as described below. The RNC 536 also comprises transmitter logic/circuitry 535 and receiver logic/circuitry 537 for communicating with other network elements, both coupled to the signal processing logic 538 as known to those skilled in the art.

In accordance with embodiments of the invention, the signal processing logic 538 of RNC 536 employs a Node B synchronisation procedure, which comprises transmitting at least one timing data packet to each Node B:
  (i) down the multicast (e.g. satellite) link and back up the unicast link; and
  (ii) down the unicast link and back up the unicast link.

Thus, the signal processing logic 538 is then able to determine a transit delay over a multicast link (Tm,down), transmitting, for example, a DL Node Synchronisation message over the multicast link, and receiving in response thereto an UL Node Synchronisation message from each Node B over the unicast link. Similarly, for example either concurrently or consecutively, the signal processing logic 538 is then able to determine a transit delay over a unicast link, by transmitting, for example, a DL Node Synchronisation message over the unicast link, and receiving in response thereto an UL Node Synchronisation message from each Node B over the unicast link.

Let us define the Round Trip Delay (RTD) values for these respective paths as being RTD1 and RTD2, respectively. Now:

$$RTD1 = Tm,down + Tu,up \quad [1]$$

$$RTD2 = Tu,down + Tu,up \quad [2]$$

Where:

Tx,y is the transit delay for the node synchronisation frame for link x (m=multicast, u=unicast) in direction y (down=downlink, up=uplink).

Typically it is reasonable to assume that the unicast link is symmetrical:

$$Tu,down = Tu,up. \quad [3]$$

Thus, the signal processing logic is capable of calculating, from equations [1], [2] and [3]:

$$Tm,down = RTD1 - RTD2/2. \quad [4]$$

Thus, in this manner, a determination of a DL transit time over the multicast link is able to be determined by supporting a consequent UL communication on a communication path with a known UL transit time.

Thereafter, the RNC is able to schedule data packets to transmit to each Node B on the DL link, for example using a multicast satellite DL transmission, taking into account the worst case transit delay as calculated by the RNC. The RNC transmits the respective data packet, such that the data packet arrives at the Node B with the worst case delay, just before the data packet is required and at other Node Bs at a time earlier than the data packet is required. Thus, when using multicast, option (ii) is followed and each Node B may buffer data packets until the signalled frame number has been reached.

In some embodiments of the invention, the Node B synchronisation procedure may employ elements of the RNC Node B Node Synchronisation procedure as defined by 3GPP. In such embodiments, the signal processing logic 538 of the RNC 536 adds a first timestamp (T1) to a timing data packet and transmits the timing data packet to each Node B 524. Each Node B 524 then adds a receive (Rx) timestamp (T2) and a transmit (Tx) timestamp (T3) of the response, and returns the timing data packet to the RNC 536. Thus, the signal processing logic 538 is then able to determine a time of response arrival T4 and, for each synchronisation procedure employed (multicast-unicast and unicast-unicast), and for each Node B, calculating:

$$RTD = (T2 - T1) + (T431\ T3) \quad [5]$$

Figure 6:
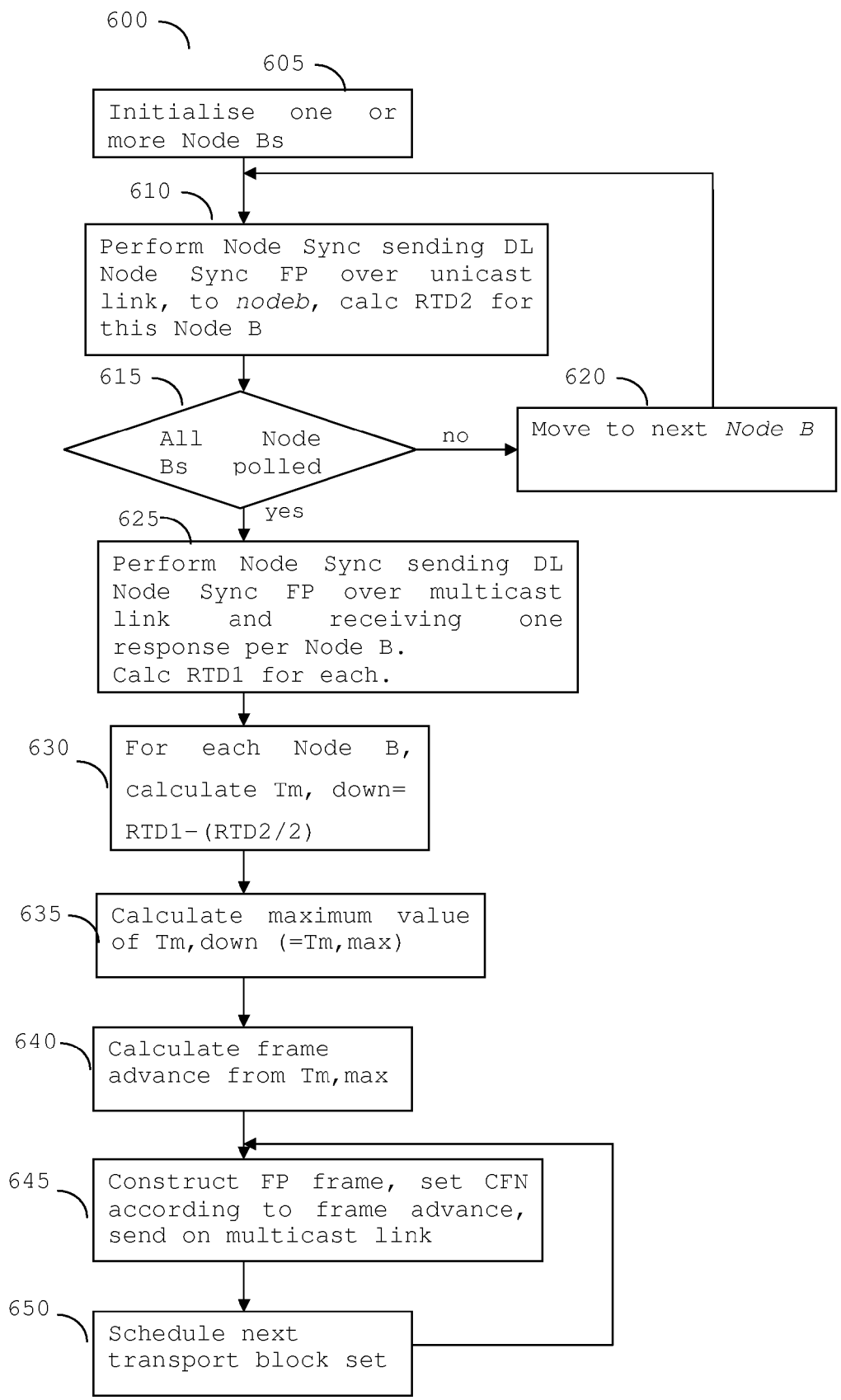
FIG. 6 illustrates a method for providing a mechanism to determine timing for MBMS point-to-multipoint distribution using IP multicast on an $I_{ub}$ link in accordance with embodiments of the invention.

Referring now to FIG. 6, a method 600 for providing a mechanism to determine timing for an MBMS point-to-multipoint distributed system using IP multicast on an $I_{ub}$ link shall be described. The method 600 determines a transit delay for packets on the DL only link by employing a Node Synchronisation procedure twice, once performed on the DL and UL of the bidirectional link and once utilising a combination of the downlink only link and uplink of the bidirectional link. The DL only link may be an IP multicast unidirectional link. Furthermore, the DL only link may be performed over a terrestrial communication network for example comprising multiple intermediate network elements such as routers, or over a satellite network.

The method 600 employed by, say, the RNC 536 of FIG. 5, commences in step 605 with an initialisation of a number of Node Bs. Then, Node Synchronisation is performed by the RNC 536 sending a 'DL Node Synchronisation Frame Protocol' over, say, a (or each) unicast link, to the (or each) Node B. The RNC then receives an 'UL Node Synchronisation Frame Protocol' returned from the (or each) Node B, and calculates RTD-2 therefrom, for this (or each) Node B, as shown in step 610. A determination as to whether all Node Bs have been polled, as shown in step 615, is made. If all Node Bs have not been polled, the next Node B is selected in step 620, and the Node B synchronisation procedure of step 610 is repeated, as shown.

Once all Node Bs have been polled in step 615, a second Node Sync procedure is employed by the RNC 536 by transmitting a DL Node Synchronisation Frame Protocol over, say, an IP multicast unidirectional DL link. The RNC then receives an 'UL Node Synchronisation Frame Protocol' returned from the (or each) Node B via an UL bi-directional link, and calculates RTD-1 therefrom, for this (or each) Node B, as shown in step 625. The RNC then calculates a multicast DL transit time (Tm,down)=RTD1-(RTD2/2), for each Node B, as shown in step 630.

Once each multicast DL transit time for each Node B has been calculated in step 630, the RNC is able to calculate a maximum value of Tm,down (=Tm,max), as shown in step 635, that is the Node B communication link having the largest delay. The RNC is then able to calculate an appropriate frame advance, based on this maximum value, to be used for the set of Node Bs that have been polled, as shown in step 640. There is one frame advance for the set of Node Bs, which represents the time in advance that is needed to send the IP multicast packet so that it is received by every Node B in good time.

In accordance with an embodiment of the invention, frame advance may be defined as a number of frames in advance of the air interface transmission of its content that any FACH FP shall be sent from the RNC. In accordance with an embodiment of the invention, a frame is approximately 10 milliseconds in length.

Thereafter, the RNC is able to construct a FP frame to be sent to each Node B, set the respective CFN according to the frame advance, and transmit the FP data packet on the multicast link, as shown in step 645. The RNC is also then able to schedule the next and subsequent FP frame (carrying the next transport block set(s)), as shown in step 650.

When a Node B receives a FACH Frame Protocol it determines the earliest SFN value which satisfies:

SFN mod 256=CFN mod 256

Where: 'mod' means take the modulus.

Since for TDCDMA all Node Bs agree on the SFN (assuming that their framing is locked by a suitable signal fed into the synchronisation port, for example, derived from a global positioning system (GPS)), the CFN stamp should be the same to each Node B for the simultaneous transmission of the transport blocks. For wideband CDMA the SFN values differ and each Node B applies its own individual offset to the signalled CFN.

In this manner, a mechanism is provided for a network element, such as an RNC, to determine a timing adjustment for MBMS point-to-multipoint distribution using IP multicast on an $I_{ub}$ link, where a DL communication link is asymmetric or unidirectional or a plurality of DL communication paths exist.

In one embodiment of the invention, with a geostationary satellite when the satellite coverage covers a relatively small area, the differential delay is relatively small (for example less than one frame). Relative, in this context, takes into account that to cover the whole of the United Kingdom the delay spread is two milliseconds; and to cover Western Europe the delay spread would be 7-8 milliseconds.

In accordance with another embodiment of the invention, a consideration is made as to whether the earth station's satellite receiver is co-located with the Node B. In principle, the receive earth station may be connected by a terrestrial multicast network to a number of Node Bs. When it is known that the differential delay on the downstream multicast link to each Node B is much smaller than the frame duration, then only one Node B from the set needs to be polled (noting that all Node Bs will respond to the DL node synchronisation sent on the multicast link). For TDCDMA, when the Node Bs are equally frame aligned, the polling of one Node B is also sufficient to determine the relative framing of the RNC and each Node B.

In other embodiments of the invention, where a symmetric bidirectional link may not be available, the aforementioned method may employ separate means to determine the uplink delay. If an alternative mechanism for obtaining an uplink delay can be used, then a subtraction from the overall delay can be made to determine the DL delay on the multicast link.

In alternative embodiments of the invention, other formats of synchronisation messages may be used. Thus, the aforementioned use of the term 'timing data packet' may encompass any message format that is capable of supporting a determination of a round-trip time and allowing a relative frame number to be determined.

Thus, the inventive concept hereinbefore described may provide one or more of the following advantages:
(i) The proposed technique assesses the transfer delay to the Node B, rather than whether different transport channels are arriving on time. The proposed technique advantageously does not need to be performed on a per transport channel basis.
(ii) The proposed technique is of benefit because it is possible to accurately set a frame advance, thereby minimising latency in the communication system and minimising the Node B buffer capacity.
(iii) The proposed technique utilises the existing RNC-Node B Node Synchronisation procedure employed over the bidirectional link, which is needed to maintain knowledge of clock/frame alignment between the RNC and Node B.

Figure 7:
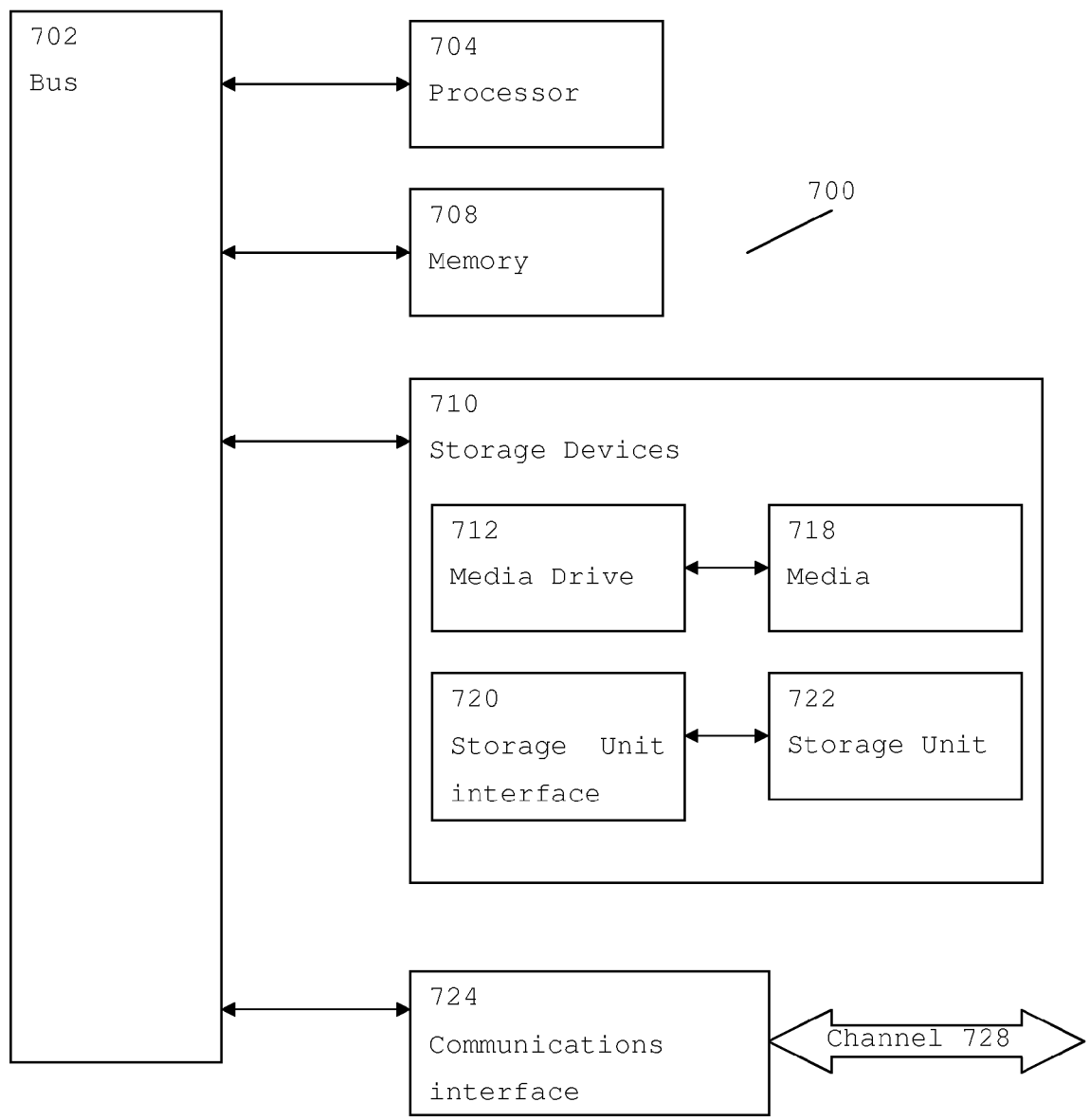
FIG. 7 illustrates a typical computing system that may be employed to implement processing functionality in accordance with embodiments of the invention.

FIG. 7 illustrates a typical computing system 700 that may be employed to implement processing functionality in embodiments of the invention. Computing systems of this type may be used in Node Bs (in particular, the scheduler of the Node B), core network elements, such as the GGSN, and RNCs, for example. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A communication network element comprising:
   a transmitter for transmitting at least one timing data packet to at least one further network element over both a first communication link that is unidirectional and a second communication link that is bidirectional;
   a receiver for receiving at least two timing data packets from the at least one further network element over the second communication link, wherein at least one of the at least two timing data packets corresponds to the timing data packet that was transmitted via the first communication link; and
   signal processing logic operably coupled to the transmitter and receiver, wherein the signal processing logic is operable to calculate a transit delay of the at least one transmitted timing data packet over the first communication link based on the at least two timing data packets received via the second communication link, and
   wherein the signal processing logic is further operable to schedule at least one transmission across the first communication link to the at least one further network element in response to the calculated transit delay.

2. The communication network element of claim 1 wherein the signal processing logic is operable to calculate a worst case transmit delay for transmissions to a plurality of further network elements.

3. The communication network element of claim 1 wherein the signal processing logic is operable to add a first transmit timestamp (T1) to the at least one timing data packet over at least one of the first communication link and the second communication link.

4. The communication network element of claim 3 further arranged to receive a timestamp (T2) indicating a time that the at least one timing data packet is received by the at least one further network element, and a second transmit timestamp (T3) indicating a time of transmitting a timing data packet to the communication network element.

5. The communication network element of claim 1 wherein the signal processing logic is operable to receive the at least two timing data packets from the at least one further network element over the second communication link in response to the respective transmissions over the first and second communication links.

6. The communication network element of claim 1 wherein the calculation of a transit delay of the at least one timing data packet by the signal processing logic comprises calculating a round-trip time for the at least one timing data packet over the first communication link and second communication link.

7. The communication network element of claim 1 wherein the first communication link is a unidirectional multicast link.

8. The communication network element of claim 7 wherein the second communication link is a bidirectional link and the signal processing logic is operable to calculate a transit delay of the at least one timing data packet over the first communication link by subtracting half of a calculated round-trip time of the at least one timing data packet over the second communication link from a calculated round-trip time for the at least one timing data packet transmitted out over the first communication link and back via the second communication link.

9. The communication network element of claim 1 wherein the communication network element is operable to support communication of a Forward Access Channel (FACH) Frame Protocol using multicast delivery.

10. The communication network element of claim 1 wherein the communication network element is operable to support communication in a 3rd Generation Partnership Project (3GPP) cellular communication network over at least one of:
   a Multimedia Broadcast Multicast Service (MBMS) with soft combining;
   MBMS over a Single Frequency Network (MBSFN);
   Iub communication over a satellite communication link; or
   Iub communication over a terrestrial communication link.

11. The communication network element of claim 10 wherein the communication network element is operable to transmit a downlink Node Synchronisation message over at least one of the first and second communication links, and in response to the downlink Node Synchronisation message, the communication network element is further operable to transmit an uplink Node Synchronisation message over the second uplink communication link.

12. The communication network element of claim 1 wherein the communication network element is one of: a radio network controller or a base station controller.

13. A communication system comprising a communication network element; the communication network element comprising:
   a transmitter for transmitting at least one timing data packet to at least one further network element over both a first communication link that is unidirectional and a second communication link that is bidirectional;
   a receiver for receiving at least two timing data packets from the at least one further network element over the second communication link, wherein at least one of the at least two timing data packets corresponds to the timing data packet that was transmitted via the first communication link; and
   signal processing logic operably coupled to the transmitter and receiver, wherein the signal processing logic is operable to calculate a transit delay of the at least one transmitted timing data packet over the first communication link based on the at least two timing data packets received via the second communication link, and wherein the signal processing logic is further operable to schedule at least one transmission across the first communication link to the at least one further network element in response to the calculated transit delay.

14. A method for determining a timing of multicast transmissions from a network element, the method comprising:
   transmitting at least one timing data packet to at least one further network element over both a first communication link that is unidirectional and a second communication link that is bidirectional;
   receiving at least two timing data packets from the at least one further network element over the second communication link, wherein at least one of the at least two timing data packets corresponds to the time data packet that was transmitted via the first communication link;
   calculating a transit delay of the at least one transmitted timing data packet over the first communication link based on the at least two timing data packets received via the second communication link; and
   scheduling at least one transmission across the first communication link to the at least one further network element in response thereto.

15. An integrated circuit for determining a timing of multicast transmissions from a network element, wherein the integrated circuit comprises:
   logic for transmitting at least one timing data packet to at least one further network element over both a first communication link that is unidirectional and a second communication link that is bidirectional;
   logic for receiving at least two timing data packets from the at least one further network element over the second communication link, wherein at least one of the at least two timing data packets corresponds to the timing data packet that was transmitted via the first communication link;
   logic for calculating a transit delay of the at least one transmitted timing data packet over the first communication link based on the at least two timing data packets received via the second communication link; and
   logic for scheduling at least one transmission across the first communication link to the at least one further network element in response to the calculated transit delay.

16. A communication network element comprising:
   a receiver for receiving at least one timing data packet from a network controller element over both a first communication link that is unidirectional and a second communication link that is bidirectional;
   a transmitter for transmitting at least two timing data packets to the network controller element over the second communication link, wherein at least one of the at least two timing data packets corresponds to the timing data packet that was received via the first communication link;
   such that a transit delay of the at least one received timing data packet over the first communication link is calculated based on the at least two timing data packets,
   wherein the communication network element is operable to receive at least one scheduled transmission across the first communication link from the network controller element based on a calculated transit delay of a transmission over the first communication link.

17. The communication network element of claim 16 wherein the communication network element is a Node B of a third generation communication system.

18. An integrated circuit for a communication network element comprising:
   logic for receiving at least one timing data packet from a network controller element over both a first communication link that is unidirectional and a second communication link that is bidirectional;
   logic for transmitting at least two timing data packets to the network controller element over the second communication link, wherein at least one of the two timing data packets corresponds to the timing data packet that was received via the first communication link; such that a transit delay of the at least one timing data packet over the first communication link is calculated based on the at least two timing data packets,
   wherein the integrated circuit is operable to receive at least one scheduled transmission across the first communication link from the network controller element based on the calculated transit delay of the transmission over the first communication link.

19. A method for a communication network element comprising:

receiving at least one timing data packet from a network controller element over both a first communication link that is unidirectional and a second communication link that is bidirectional;

transmitting at least two timing data packets to the network controller element over the second communication link, wherein at least one of the two timing data packets corresponds to the timing data packet that was received via the first communication link; such that a transit delay of the at least one timing data packet over the first communication link is calculated based on the at least two timing data packets, and receiving at least one scheduled transmission across the first communication link from the network controller element based on the calculated transit delay of the transmission over the first communication link.

* * * * *